Sept. 1, 1970  S. N. CHOPRA ET AL  3,526,569
CRINKLED PLASTIC RIBBON
Filed April 10, 1969  4 Sheets-Sheet 1
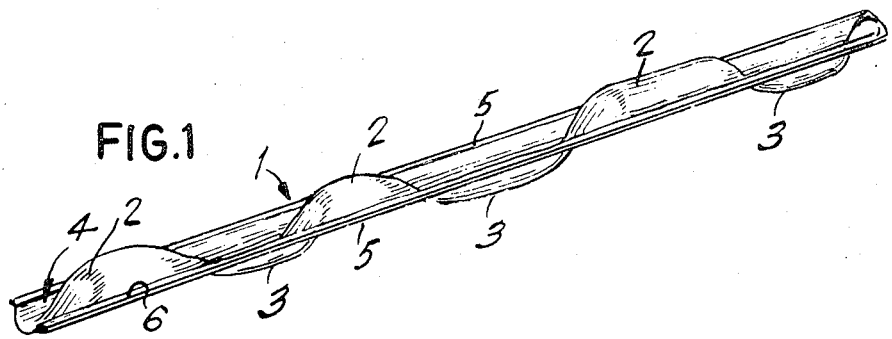
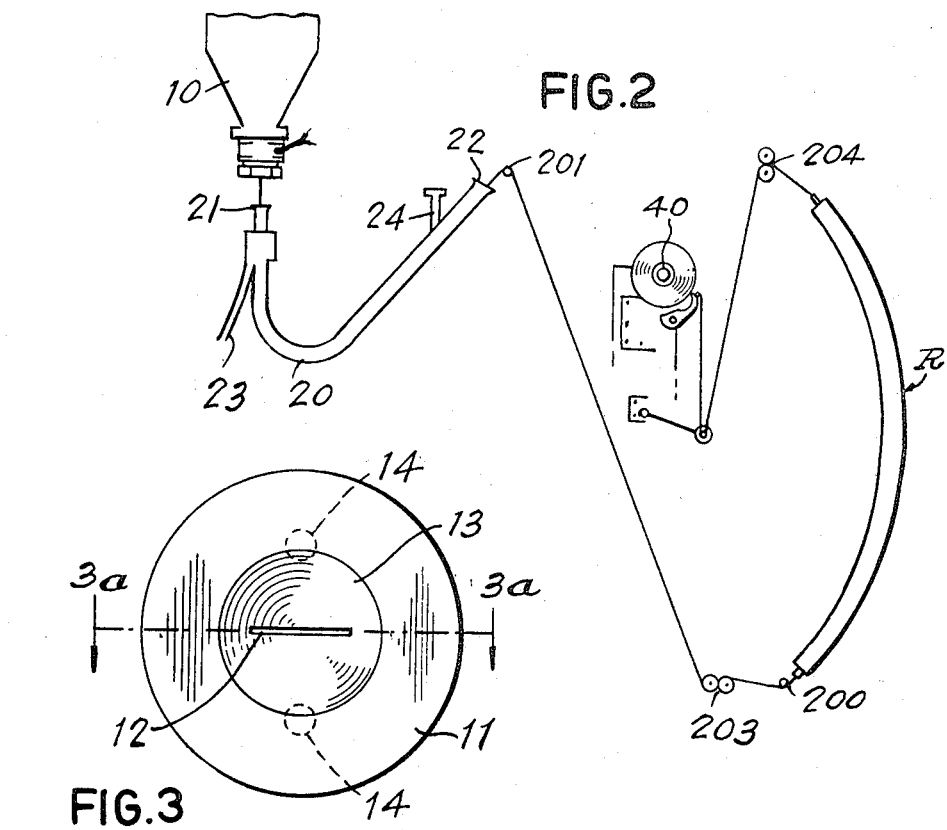
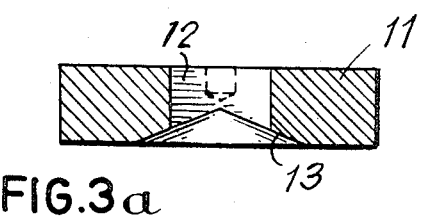
INVENTORS
Sohinder Nath CHOPRA
Hilaire Marcel TURMEL

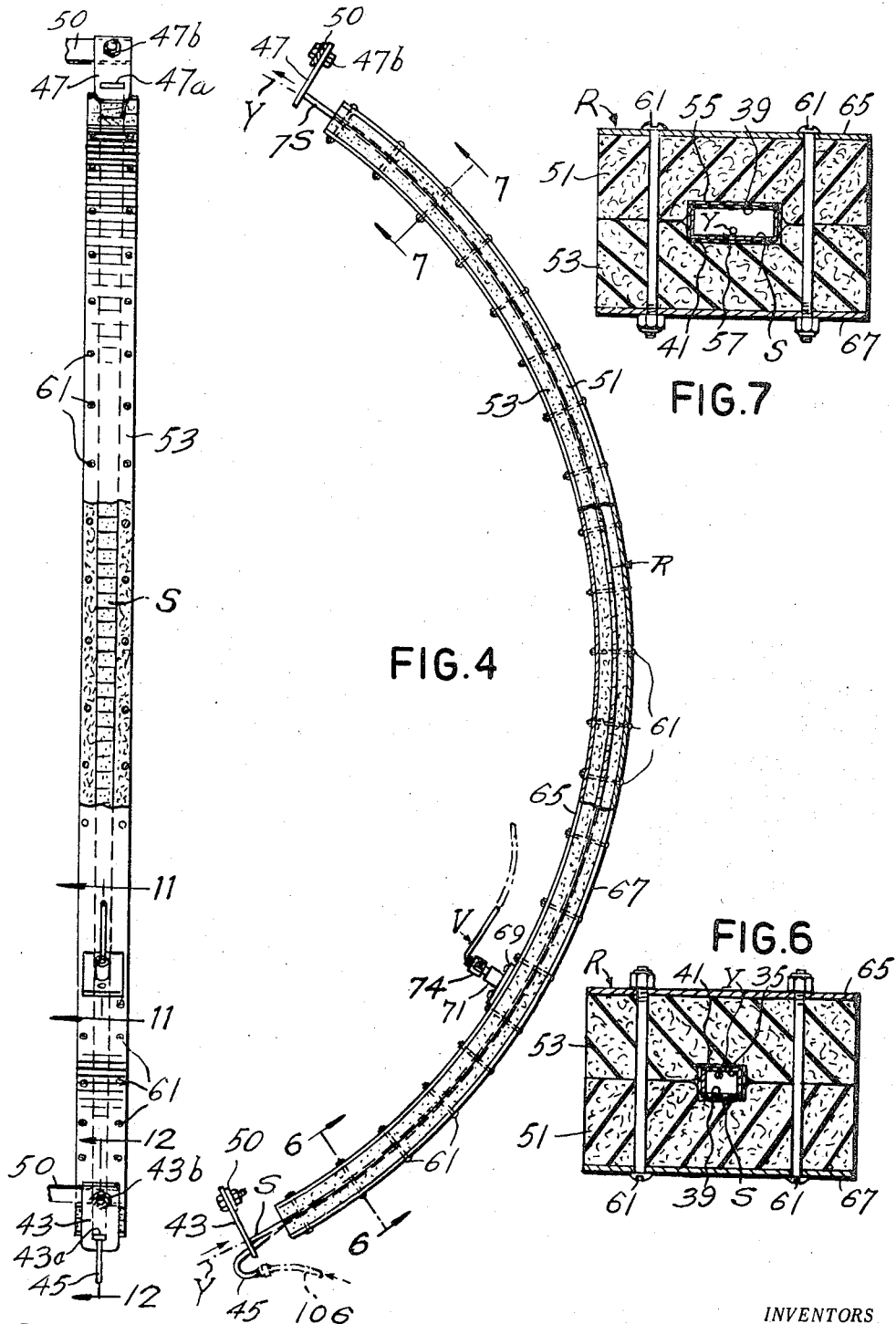

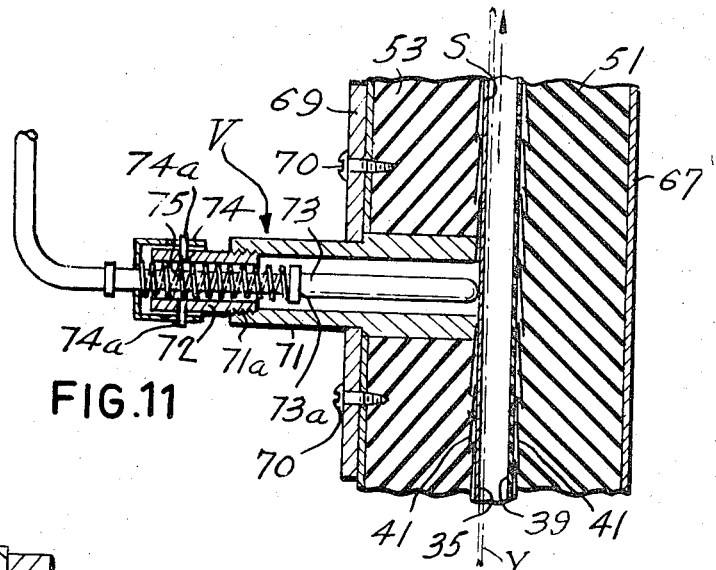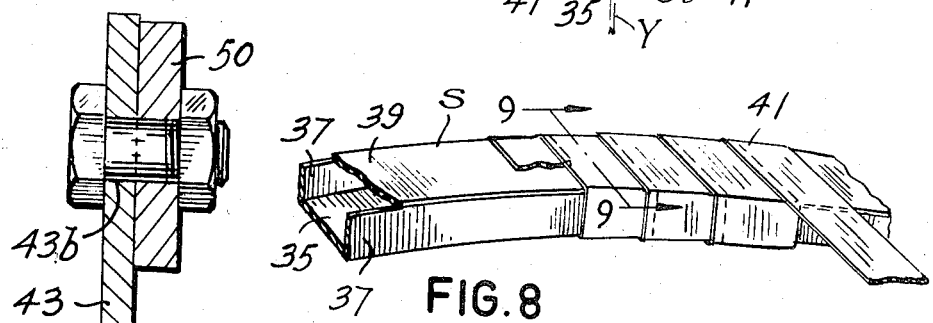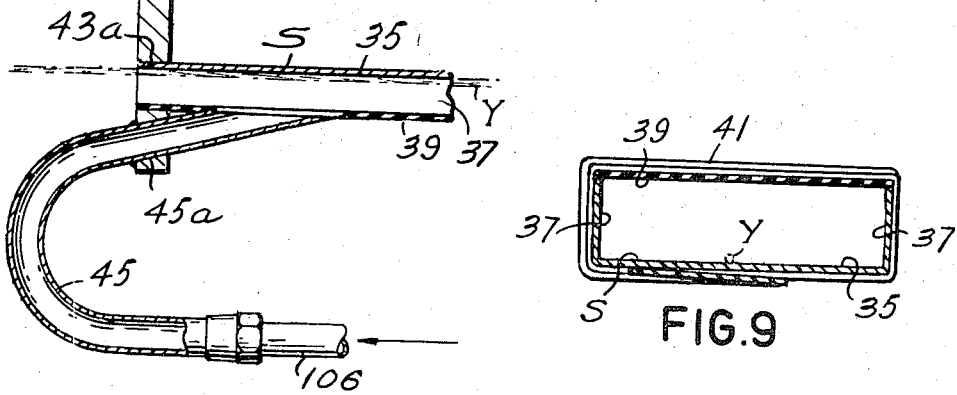

Sept. 1, 1970          S. N. CHOPRA ET AL          3,526,569
                      CRINKLED PLASTIC RIBBON
Filed April 10, 1969                              4 Sheets-Sheet 4
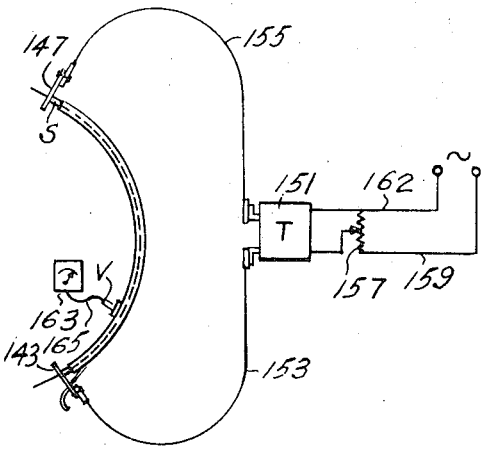
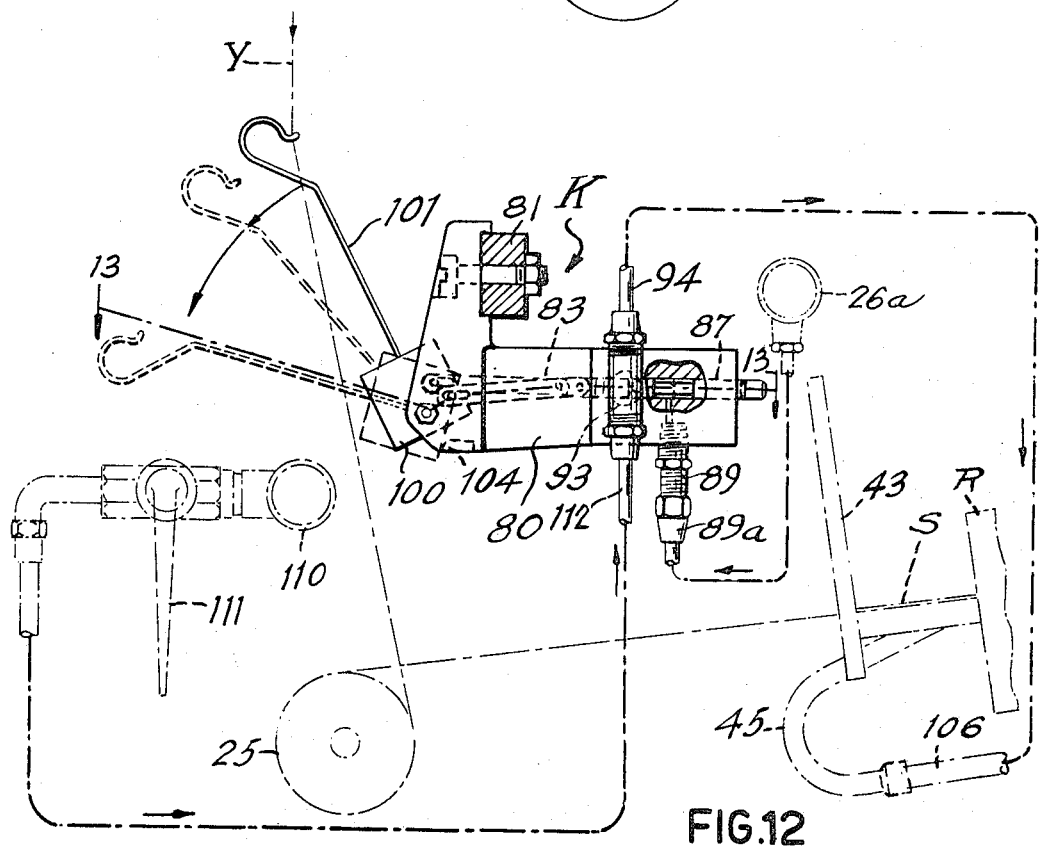
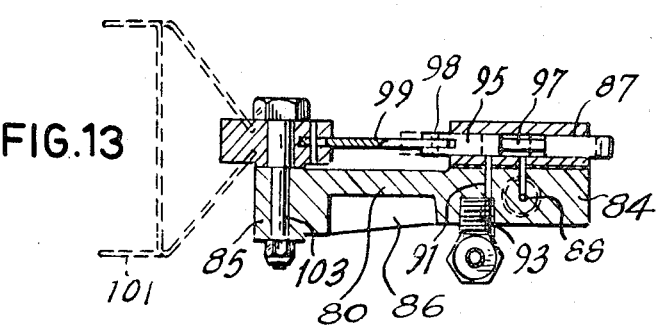
INVENTORS
Sohinder Nath CHOPRA
Hilaire Marcel TURMEL

United States Patent Office 3,526,569
Patented Sept. 1, 1970

3,526,569
CRINKLED PLASTIC RIBBON
Sohinder Nath Chopra, 1379 Aberdeen St., Hawkesbury, Quebec, Canada, and Hilaire Marcel Turmel, 260 Garceau St., Drummondville, Quebec, Canada
Continuation-in-part of application Ser. No. 558,120, June 16, 1966. This application Apr. 10, 1969, Ser. No. 815,044
Int. Cl. D02g *3/00*
U.S. Cl. 161—173
3 Claims

ABSTRACT OF THE DISCLOSURE

The present invention relates to a flat-extruded yarn or ribbon of melt-extrudable thermoplastic material having a characteristic surface configuration, said yarn or ribbon having two opposed faces, substantially straight and parallel side edges and an interior crimped region between the edges in the form of a series of blister-like depressions and protrusions on both faces.

---

This is a continuation-in-part of U.S. Ser. No. 558,120 filed June 16, 1966 and now abandoned.

Flat-extruded yarn of melt-extrudable thermoplastic material conventionally finds application in many types of fabrics, of which carpet backing is a particularly useful example. The word "yarn" is generally applied to flat, continuous filamentary material having a width below about $\frac{1}{16}$ inch. Above this width, more usually from about $\frac{1}{8}$ inch width upwards, the word "ribbon" is more apt to describe the material. It is contemplated within the scope of the present invention to provide material of a width within a preferred range of about 0.01 inch to about $\frac{1}{4}$ inch and with this dimension in mind, the material will be referred to herein as "flat-extruded yarn or ribbon."

Conventional thermopalstic flat-extruded yarn or ribbon is generally produced by extruding a wide sheet and slitting such sheet into narrow widths. It may also be produced by extruding the material through a relatively narrow flat orifice. The continuous filamentary material thus produced according to the known art is smooth and slippery. The material has little aesthetic or artistic appeal and suffers from the functional disadvantage that it is difficult to knot, and that crossing filaments in a fabric containing the material tend to slip on the smooth surface. To avoid the latter disadvantage, flat yarn for use in fabrics is sometimes crimped transversely by being passed through meshed gears or by being passed through a stuffer box. Crimping of this kind weakens the lengthwise stiffness or resiliency of the yarn and does not added to its aesthetic appearance.

In accordance with one aspect of the present invention, there is provided a flat-extruded yarn or ribbon of thermoplastic material having two opposed faces, substantially straight and parallel side edges and an interior crimped region between the edges in the form of a series of blister-like depressions and protrusions on both faces.

The yarn or ribbon, in accordance with the invention, preferably has an overall width between the stated edges within the range of about .01 inch to about $\frac{1}{4}$ inch, and a thickness between the faces within the range of about .0005 inch to about 0.005 inch. The length of the depressions and protrusions may lie within the range of about $\frac{1}{16}$ inch to about $\frac{1}{8}$ inch. The depressions and protrusions may be about 0.005 to 0.015 inch deep. The melt-extrudable thermoplastic material is preferably selected from the group consisting of polyethylene, polypropylene, and polyacetal, and the preferred material is polypropylene.

The yarn or ribbon in accordance with the invention combines artistic and aesthetic appeal with novel functional characteristics and advantages. Since the surface deformations do not extend the whole way across the width of the yarn or ribbon, and since the blisters add additional rigidity in the lengthwise direction to the yarn, the latter exhibits an appreciable rigidity or resiliency in the lengthwise direction. For these reasons, ribbon in accordance with the invention having a width towards the maximum of the stated range, finds application as decorative material which may be used, for example, for tying parcels and for similar purposes.

Yarn, in accordance with the invention in about the middle or towards the smaller part of the stated width range, finds application in fabrics, especially carpet backing, for example, the type of carpet backing described and claimed in our co-pending application, U.S. Ser. No. 498,389, filed Oct. 20, 1965 and now Pat. No. 3,443,541.

In accordance with a second aspect of the present invention, there is provided a process for manufacturing a flat-extruded yarn or ribbon of melt-extrudable thermoplastic material having two opposed faces, substantially straight and parallel side edges and an interior crimped region between the edges in the form of a series of blister-like depressions and protrusions on both faces, comprising the steps of:

Melt extruding a flat yarn or ribbon having substantially a viscosity gradient set therein, from a melt extruded having a jet in the form of a slot and generating a substantial viscosity gradient, Quenching the extruded yarn or ribbon to ambient temperature, and Stretching the cooled yarn or ribbon. Generally the stretching is done by driving it under tension in contact against a convexedly curved surface heated at a temperature at or above the softening point and below the melting point of the said thermoplastic material, the yarn or ribbon being taken up after stretching at a faster speed than it is fed to the stretching surface.

Preferably, the temperature of the said curved surface is maintained within the range of about 100° C. to about 160° C.

Having thus generally described the invention, it is hereafter illustrated by preferred embodiments of the yarn or ribbon, and of apparatus for its manufacture, illustrating the method of manufacture, which are described with reference to the accompanying drawings, in which:

FIG. 1 is a greatly enlarged perspective view of a crinkled yarn or ribbon in accordance with the invention;

FIG. 2 is a schematic representation of apparatus for the manufacture of the yarn or ribbon of FIG. 1, illustrating the method of manufacture;

FIG. 3 is a bottom plan view of a jet for the extruder forming part of FIG. 2;

FIG. 3a is a section along the line 3a—3a of FIG. 3;

FIG. 4 is a vertical cross-section through a heating tube forming part of the apparatus;

FIG. 5 is a front elevation of the tube of FIG. 4;

FIG. 6 is a transverse cross-section along the line 6—6 of FIG. 4;

FIG. 7 is a transverse cross-section along the line 7—7 of FIG. 4;

FIG. 8 is a fragmentary perspective view on a large scale of the tube of FIG. 4 partly assembly and showing its form of construction;

FIG. 9 is a transverse cross-section on a still larger scale along the line 9—9 of FIG. 8;

FIG. 10 is a greatly enlarged cross-section along the line 10—10 of FIG. 5;

FIG. 11 is a greatly enlarged cross-section along the line 11—11 of FIG. 5;

FIG. 12 is a side elevation on an enlarged scale of an automatic cooling and piling up mechanism;

FIG. 13 is a horizontal cross-section partly in elevation along the line 13—13 of FIG. 12; and FIG. 14 is a diagrammatic view showing particularly the electrical circuit for supplying current to the heating unit.

With reference to FIG. 1, there is shown a yarn or ribbon 1 of polypropylene having, for example, the width of 0.110 inch and a thickness of, for example, 0.002 inch. The yarn exhibits a series, in alternating sequence, of blister-like protrusions 2 and depressions 3 when viewed from the top face 4 as shown in FIG. 1. The number of blisters per inch may vary between about 3 and about 10, the typical ribbon shown having, for example, 6 blisters per inch. The blisters vary in length from about $\frac{1}{16}$ inch to $\frac{1}{8}$ inch.

As shown, the yarn retains substantially straight and parallel sides edges 5, and the protrusions and depressions are restricted to substantially a central region. Occasionally, a blister will extend into one or other side edge deforming that edge, and it is within the scope of the invention that such occasional departures from the norm occur.

Over a greater part of the length at least, the straight edges 5 are continuous, and there is usually a flat edge portion 6 of each surface on either side of a blister-like protrusion or depression.

The transverse shoulders lying between a depression and the adjacent protrusions add rigidity to the yarn or ribbon.

THE APPARATUS

The apparatus is generally shown in FIG. 2 and consists essentially of a melt extruder 10, a quencher 20, a heat stretching tube R, and a constant tension winder 40.

The melt extruder 10 may be any type of melt extruder for the melt spinning of melt-extrudable thermoplastic materials, provided that the melt extruder selected is able to develop a substantial viscosity gradient in said melt-extrudable thermoplastic materials and at least maintain it up to the spinneret orifice. This gradient may be brought about by merging a plurality of flows of melt-extrudable thermoplastic materials having different intrinsic viscosity indices at a given temperature, or preferably flows of an homogeneous molten thermoplastic material, said flows having been subjected to different heat treatment prior to extrusion at the spinneret orifice.

An example of extruder suitable for this purpose has been the subject of U.S. Pat. 3,354,250 dated Nov. 21, 1967 owned by the same assignee, which was copending with our parent application 558,120. The said Pat. 3,354,250 is incorporated herein by reference.

As particularly seen from FIG. 10 and columns 6 and following of the said reference patent, by the feeding screw S the polymeric material reaches an aluminum block N having elongated passages 280. By controlling the heat generated by the band heater 285, one is able to make colder the material passing through the passages 280 located near the central axis of the block N, than the material passing through the passages 280 located near the periphery of the block N or closer to the band heater 285. The molten material so treated is able to attain a substantial viscosity gradient, and may then move through the remaining portion of the extrusion apparatus up to the spinneret orifice as a substantial laminar flow (i.e., under such condition that the flow is not homogenized).

Other means may also be used to set a viscosity gradient, such as heating more intensively the innermost portion of the molten material. If necesary, cooling could be used instead of heating. Variation of the concentration of the materials, or dilution, is also contemplated.

By "substantial viscosity gradient," it is meant that at the spinneret, the flat yarn or the ribbon obtained has a viscosity gradient which is such that after quenching and stretching, the flat yarn or ribbon will crimp. For example, it has been found that with polypropylene, if an apparatus as shown in FIG. 10 of U.S. Pat. 3,354,250 is used, the temperature of the heating block should be maintained at a temperature between 250°–300° C. and preferably 275°–300° C. when the debit rate at the spinneret orifice is about 1 to 3¾ lbs. The spinneret being also maintained at about that temperature or about 5–10° C. higher.

The extruder should terminate in a spinneret having a single jet orifice in the form of a slot. A preferred jet is illustrated in FIGS. 3 and 3a. The plate 11 of the jet may typically have dimensions .465 inch thick by 1.996 total diameter. Typical dimensions of the slot 12 are .625 inch in length by 0.012 inch in thickness. The bottom of the jet has a central dishing bounded by a conical surface 13. Tapped holes 14 are provided for adjusting the orientation of the jet.

As the flat yarn or ribbon leaves the extruder, it is immediately quenched in running water at ambient temperature in the quencher 20. As shown in FIG. 2, this consists of a generally U-shaped tube having a flared inlet 21 and a flared outlet 22 for the yarn and having a separate water inlet 23 and a separate water outlet 24 in the side wall of the tube, the water inlet and outlet being arranged to provide a continuous level of running water within the U-shaped tube. As shown, the quencher tube has a vertical limb at the input where the yarn enters, the outlet limb being at an angle to the vertical.

The ribbon leaves the outlet of the quenching device with its flat side rubbing against the lips of the outlet. This helps to drain back into the quencher any water particles that may be riding on the ribbon. As shown in FIG. 2, the inlet to the quencher is arranged immediately below the extruder jet. In the preferred case, the distance between the extruder jet and the inlet of the quencher is only two inches. This causes rapid cooling of the extruded ribbon or yarn. The bend of the U of the quencher should be of sufficient radius to avoid undue strain on the ribbon as it is being drawn around the convex inner surface and while it is being cooled. The radius of the U, for example, may be of the order of about four inches.

After passing out of the quencher, the yarn is passed over a first guide roll 201, and through a first pair of nip rolls 203 to a second guide roll 200 at the inlet of the heating tube R to be described. As it leaves the outlet of the stretching tube R, the yarn is passed through a second pair of nip rolls 204 to a constant tension winder 40 of conventional type.

Both the pairs of nip rolls 203 and 204 are driven, the nip rolls 204 being driven at a faster speed than the nip rolls 203 so as to cause the yarn to stretch during its passage through the heat stretching tube R.

The heat stretching tube R may be of the kind described in Canadian Pat. 699,470. However, it is preferred to use a similar stretching tube of improved construction described in our co-pending application as follows:

United States Ser. No. 488,832, filed July 26, 1965 and now Pat. No. 3,277,228.

The improved stretching tube is shown in detail in FIGS. 4 to 14 inclusive and incorporates a device for blowing air through the tube in the event of fracture of the yarn or ribbon which would otherwise cause the tube to overheat. The blowing device is also an aid to threading the yarn or ribbon through the tube.

The tube or element R is made up of an elongated bowed trough or channel member S, formed from a single sheet of electrically conductive metal of the shape shown in FIGS. 4 to 9. The trough S has a convexly curved floor 35 which preferably increases regularly in width from the receiving end to the exit end and which is bounded at each side by an upstanding integral flange or wall 37, which is of the same height throughout the length of the channel member S.

Against the outside of the trough so formed there is placed a glass fabric base laminate insulating strip 39 which lies on the top of walls 37 and bridges the trough.

The trough with the strip 39 in place is tightly wound with glass fibre tape 41 so as to form a four-sided tube of which the floor 35 and walls 37 constitute three sides and the strip 39 the other side.

The inlet end of the tube is provided with a copper terminal member 43 having an opening 43a receiving the end of the tube and a connecting opening 43b. A threading nozzle in the form of a J-shaped tube 45 extends through a diagonal opening 45a in the terminal member 43 and enters the bottom of the trough S at an angle as shown. The outlet end of the trough S is also provided with a copper terminal 47 having an opening 47a receiving the end of the trough S and a connecting opening 47b. The connection between the metal part of the tube R and the terminals 43 and 47 can be by welding, brazing, or any other suitable method. This also applies to the connection between the tube 45 and the plate 43.

The trough S is encased with insulation as follows. Elongated coated juxtaposed fibreglass blocks 51 and 53 are each provided with grooves 55 and 57 respectively which form between them a channel receiving the tube including the trough S, and its covering. The outer face of the block 51 is clad with an aluminum facing sheet 65 and the block 53 is provided with an aluminum facing sheet 67. The blocks 51 and 53 are clamped together by non-magnetic screws 61 which extend through them and their cladding 65 and 67 periodically along the length of the heating element R.

A thermocouple device V is connected to and extends through openings in the facing sheet 65 and the block 53. This thermocouple has a base 69 which is held by screws 70 to the sheeting 65 and its underlying block 53. A sleeve 71 has a part which extends through openings in the base 69, sheet 65 and block 53 to a point adjacent the outer surface of the trough S. The sleeve 71 also has a part projecting outside the block 53. The outer end of the sleeve 71 is internally threaded as at 71a to receive the threaded end of a nipple 72 carrying at its outer end a bayonet cap 74 held to it by a screw 74a. A thermocouple bulb 73 is positioned in the sleeve 71 with an extension passing back through the cap 74. A coil spring 75 is mounted on the extension of the bulb 73 and acts between a shoulder 73a on the bulb and the cap 74 to urge the inner end of the bulb 73 against the wall of the trough S. The extension of the bulb 73 leads to an instrument 163 (FIG. 14) where a reading may be taken of the temperature sensed by the bulb 73.

AUTOMATIC COOLING DEVICE

The automatic cooling device K is best shown in FIGS. 12 and 13. This device includes a body 80 which is mounted on a beam 81 which extends along the length of the machine and also carries the similar stop motions for the other tubes R. The body 80 is of the cross-sectional shape shown in FIG. 13 and has a widened head 84 projecting to one side and a widened foot 85 extending to the other side and separated therefrom by a neck 86. The head 84 is provided with a bore 87 extending through it from back to front and an inlet passage 88 leading from a nipple 89 connected to an air inlet pipe 89a. An outlet passage 91 extends from the bore 87 to a T 93 connected to an air pipe 94 leading to the cooling air connection 45. A piston 95 is operably mounted in the bore 87. The piston has an intermediate narrow part 97. The front of the piston is pivotally connected by a pin 98 through a slot in a link 99 which in turn is pivotally connected to a block 100 mounting a drop wire 101. The block 100 is pivotally mounted on a bolt 103 extending through the opening in the part 85. A stop bracket 104 is mounted on the neck 86.

In operation, the drop wire 101 is in the upper position shown in dotted lines and is held in that position by the yarn under tension running from the nip rolls 60 to the entrance of element R. In this position, the front thick part of the piston 95 blocks the outlet opening 91 and thus cuts off its supply of air from the inlet opening 88. When the yarn breaks, the wire 101 is no longer supported and falls from the position shown in full lines in FIG. 12. The fall is slow at first because the wire 101 is nearly vertical. The slot 99a has been provided in the link 99 which acts as an elongated pivot hole thus allowing the wire 101 to fall freely through the first half of its travel, which develops sufficient momentum to start the movement of the piston 94. The movement is completed during the second half of the travel. The fall of the wire 101 pulls the piston 94 forward and clears the exit passage 91 thus allowing the air to pass through it from the passage 88. The air is immediately blown through the J connection 45 and into the tube R. This air serves to prevent the tube R from overheating when the yarn breaks.

The apparatus is also provided with means for piecing up the yarn if it breaks. This includes a compressed air pipe 110 provided with a manual valve 111. The valve 111 is connected by a pipe 112 to the T 93 of the stretching unit. Through the T 93 the pipe 112 is connected with the pipe 106 and thus with the J-connection 45. By opening the valve 111 compressed air is applied immediately to the J-connection 45 and through the trough S. The end to be fed is introduced into the end of the trough S carrying the stream of air, thus created, and is blown by it through the trough S from inlet to outlet. Once the new end of yarn is passed through the tube and onto the take-up rollers 29 and 30, the drop wire 101 is reset by the operator into its normal upper position shown in full lines in FIG. 14 and the heating-stretching operation is continued as previously described until there is another break.

Electric current is supplied through a transformer 151 by a wire 153 through the terminal member 43 and connected by a wire 155 through the terminal member 147 (FIG. 14). The transformer is of suitable voltage and suitable amperage for heating the trough S to the desired temperature of a multiplicity of troughs in series or series parallel. The temperature may be controlled manually by means of a variable voltage device 157. A thermocouple type of temperature-indicating instrument 163 may be connected to the thermocouple V by wire 165 so as to indicate the temperature of the trough S. The instrument 163 may be connected into the electrical system so as automatically to regulate the temperature, if desired.

If desired, a number of heating elements R may be provided on a single frame to stretch yarn or ribbon from a corresponding number of extruders. They may be connected in series on a single transformer.

The trough S is made preferably from stainless steel sheet in the annealed state, or Chromel sheet, or Nichrome, bent into trough shape. According to a preferred construction, it is polished to a "mirror" finish on the inside or yarn guiding face then vapour blasted to a so-called "satin" finish. This finish preferably consists of irregularities approximately 5 microns deep on the average, spaced in the range of 10 to 20 microns from peak to valley in all directions. After vapour blasting, the surface is provided with chromium plate, for example, about 0.002 inch thick. The irregularities may range from about 3 microns to about 8 microns in depth and may be spaced within the range of about 10 to 50 microns (from centre to centre). Where the surface of the trough S has been treated to reduce friction, as described, the curvature of the trough S is not critical.

Such a surface may be prepared by first polishing the metal surface to a mirror-like finish. Then blasting with a fine abrasive powder carried in a stream of air and water vapour at high velocity. This provides the surface with a multitude of microscopic indentations. The thus prepared surface is then chromium-plated. The resulting chromium-plated surface reduces the frictional resistance of the surface to the yarn substantially to a minimum and prevents wear. For a surface of this nature, the curvature is not critical, whereas, without such a friction-free surface, it is desirable that the curvature of the surface be such that it is relatively less curved at the inlet end to reduce the friction and it is more curved towards the outlet end, so as to provide a certain amount of friction. Thus, at the inlet end, the yarn or ribbon is not subjected to any substantial friction, and thus is not stretched before it is sufficiently softened, while towards the outlet end it is softened and is then subjected to friction and stretched. With the chromium-plated surface as described, the resistance offered to the yarn or ribbon is at a minimum and consequently, the curvature being much less critical, the stretching trough may be curved to suit a particular assembly or machine to provide a convenient location at the inlet and outlet for ease of operation.

The length of element R may be adapted to suit the machine, with the length about as long as practical without exceeding the maximum reach of the average operator. Shorter lengths can be used, but the speed of stretching would have to be reduced accordingly. If the length of the tube is increased, maintaining the same radius, the machine would have to be higher. If the radius is decreased maintaining the same length, the tube would project further out the back and occupy more floor space.

The radius of the trough S may vary from inlet to outlet with the maximum radius at the inlet and the minimum radius at the outlet. The surface may take a single curve or a series of curves of varying radii. The greater the curvature, the greater the tension on the yarn. The ideal curvature maintains contact of the surface with the yarn but is insufficient to cause drag or high friction. Preferably, the radius of the curvature of the trough S should remain within about 24 inches and about 40 inches and may vary in curvature along the length with the short radius preferably at the outlet end. A practical length is between about 4 feet and 8 feet, it being understood that when the tube is shorter, the stretching speed would be reduced.

A preferred overall length is about 6 feet from terminal to terminal, bent into an arc comprising 128½° of a circle. This shape of tube provides suitable pressure of the yarn against the running surface and the length is sufficient for ordinary rates of stretching. A typical trough-shaped heating element having a length of 72 inches through the first 68½° of its curvature and then a radius of curvature of about 30 inches for the last 60° of its curvature with a transition between these two radii of curvature in between.

Theoretically, the thickness of the metal wall of the trough can vary considerably. The thicker the wall, the more amperage is required in theory, the tube could be as thin as about 1/64 inch, but it would not be self-supporting. It is preferred that the metal wall of the trough be in the neighbourhood of 1/16 inch, when constructed as shown.

A preferred metal for the manufacture of the trough S is an alloy of nickel and chrome, available on the market under the trademarks "Chromel" and "Nichrome." These metals are ideal since they have high electrical resistance, sufficient heat conductivity and are free from oxidation when operated at high temperatures. Most of the chrome-nickel stainless steel alloys, although of lower electrical resistance, are also suitable and are readily available for tube forming. The amperage used for heating must be adjusted in accordance with the resistivity of the metal used and the thickness of the wall.

The amperage used for heating may be varied to suit the composition of yarn or ribbon and dimensions being stretched. The temperature of the trough must be adjusted to heat the yarn or ribbon to its softening point. The exact temperature will vary with different types of yarn. For polypropylene, for example, the temperature is preferably within the range from about 115° C. to about 155° C. measured at the surface of the floor 35. While the preferred heating surface has been described as the convex floor of a trough S made from a strip of metal, it should be understood that the principle of the invention can also be employed using heating surfaces having other cross-sectional shapes, for example, cylindrical, D-shaped, etc. The surface of the conformation described, however, has decided advantages, and it is therefore greatly preferred.

It may be desirable to pass the yarn or ribbon through several tubes in series with a pulley between them to the necessary longer residence time at higher speeds and higher stretch ratios. The tubes are normally connected in series electrically but can be connected in parallel or in any series-parallel combination. In all cases, they should preferably be calibrated so that their respective electrical resistances are identical.

The tape with which the trough S is wrapped may be plain woven glass fabric completely dry with no adhesive and coated with shellac, phenol resin, or other suitable adhesive.

The ratio of input speed may vary widely for different types of parn or ribbon, but a preferred stretch range is between 3 and 6 times the extruded length.

The winder 40 and the drive rolls 60, 61 are preferably adjustable in speed to accommodate different stretch ratios ranging from 3:1 to 12:1 and for different speeds, the element R being adjustable to different temperatures, making the apparatus suitable for a wide range of different polymers.

The tension in yarn as it leaves the final heating zone is determined by the force required for stretching at the optimum stretching temperature. The tension in the yarn as it enters the heating element equals the stretching tension minus the force required to overcome the friction caused by the yarn sliding on the surface. The curvature and length and temperature of the tube is designed so that the tension on the yarn does not increase to the stretching tension util the yarn has been heated to optimum stretching temperature. The optimum temperature varies in relation to the dimensions of the yarn or ribbon, stretch ratio, speed and the viscosity of the parent polymer, but generally it is in the range of about 100° C. to about 135° C.

Example

A polypropylene ribbon was melt extruded using Hercules Powder Company's Profax 6501 resin. The following extrusion conditions were used:

Extrusion temperature—270° C.
Extrusion output—1¼ lbs. per hour
Extrusion speed—55 feet per minute
Cooling water temperature—20° C.
Distance of water level from jet face—2 inches
Jet orifice—0.012 inch x ⅝ inch x ½ inch deep
Temperature of stretching surface—120° C.
Stretch ratio—4.5:1
Ribbon size—1100 denier, 0.002 inch thick x 0.110 inch wide The crinkled ribbon produced had 6 blister-like crinkles per inch. The blisters were 1/16 inch to ⅛ inch long and 0.0095 inch high. The apparent thickness of the ribbon was therefore 0.021 inch.

We claim:
1. A flat-extruded yarn or ribbon of melt-extrudable thermoplastic material having two opposed faces, substantially straight and parallel side edges, the overall width between said edges being within the range of about 0.01 inch to about ¼ inch, and an interior crimped region between the edges in the form of a series of blister-like depressions and protrusions on both faces, the length of said depressions and protrusions lying within the range of about 1/16 inch to about ⅛ inch and the depth of said depressions and protrusions lying within the range of about 0.005 inch to 0.015 inch.

2. A yarn or ribbon as claimed in claim 1 having a thickness between said faces within the range of about .0005 inch to about 0.005 inch.

3. A yarn or ribbon as claimed in claim 1 wherein said thermoplastic material is selected from the group consisting of polyethylene, propylene and polyacetal.

References Cited
UNITED STATES PATENTS

| | | | |
|---|---|---|---|
| 2,200,946 | 5/1940 | Bloch | 161—180 X |
| 3,017,686 | 1/1962 | Breen et al. | 161—177 X |
| 3,142,147 | 7/1964 | Betsch | 161—177 X |
| 3,332,828 | 7/1967 | Faria et al. | 161—67 X |
| 3,422,176 | 10/1965 | Jamison | 161—173 X |

ROBERT F. BURNETT, Primary Examiner

R. L. MAY, Assistant Examiner

U.S. Cl. X.R.

161—179, 180, 181; 264—168, 210